US012742428B2

(12) United States Patent
Hou

(10) Patent No.: US 12,742,428 B2
(45) Date of Patent: Sep. 22, 2026

(54) INJECTORS, METHODS, AND SYSTEMS FOR DUAL FUEL COMBUSTION

(71) Applicants: Deyang Hou, Fulshear, TX (US); QUANTLOGIC CORPORATION, Fulshear, TX (US)

(72) Inventor: Deyang Hou, Fulshear, TX (US)

( * ) Notice: Subject to any disclaimer, the term of this patent is extended or adjusted under 35 U.S.C. 154(b) by 0 days.

(21) Appl. No.: 18/710,043

(22) PCT Filed: Dec. 6, 2022

(86) PCT No.: PCT/US2022/051922

§ 371 (c)(1),
(2) Date: May 14, 2024

(87) PCT Pub. No.: WO2023/091802

PCT Pub. Date: May 25, 2023

(65) Prior Publication Data

US 2025/0290455 A1 Sep. 18, 2025

(51) Int. Cl.

| | |
|---|---|
| ***F02D 19/06*** | (2006.01) |
| ***F02D 19/02*** | (2006.01) |
| ***F02D 19/08*** | (2006.01) |
| ***F02D 19/10*** | (2006.01) |
| ***F02M 43/04*** | (2006.01) |
| ***F02M 61/18*** | (2006.01) |

(52) U.S. Cl.

CPC ............. *F02D 19/06* (2013.01); *F02D 19/02* (2013.01); *F02D 19/08* (2013.01); *F02D 19/10* (2013.01); *F02M 43/04* (2013.01); *F02M 61/18* (2013.01)

(58) Field of Classification Search

CPC .......... F02D 19/06; F02D 19/02; F02D 19/08; F02D 19/10; F02M 43/04; F02M 61/08; F02M 61/18

USPC ...... 239/398, 413, 453, 533.1, 533.7, 533.8; 123/525

See application file for complete search history.

(56) References Cited

U.S. PATENT DOCUMENTS

| | | | | |
|---|---|---|---|---|
| 4,693,424 A * | 9/1987 | Sczomak | ............... | F02M 61/08 239/453 |
| 6,336,598 B1 * | 1/2002 | Touchette | .......... | F02M 21/0263 239/408 |
| 8,800,529 B2 * | 8/2014 | Wickstone | ........... | F02M 61/182 123/525 |
| 9,863,385 B2 * | 1/2018 | Graham | ............. | F02M 63/0014 |
| 2013/0047964 A1 | 2/2013 | Kim | | |
| 2017/0175693 A1 | 6/2017 | Hou | | |

OTHER PUBLICATIONS

International Search Report and Written Opinion for PCT/US2022/051922 dated Feb. 28, 2023 (14 pages).

* cited by examiner

*Primary Examiner* — Steven J Ganey
(74) *Attorney, Agent, or Firm* — Mueting Raasch Group

(57) ABSTRACT

A fuel injector for adaptive dual fuel injections has means to directly inject two types of fuels, which can be gas and liquid, or liquid and liquid, independently and collaboratively through a single nozzle. A fuel injection method and systems, along with a combustion method using the same, are also disclosed. The disclosed injectors, methods, and systems are applicable for conventional gas and liquid fuels, such as diesel, gasoline, natural gas, propane, as well as renewable liquid and gas fuels in general, including e-fuels, such as biodiesel, methanol, ethanol, hydrogen, biomethane, etc.

16 Claims, 17 Drawing Sheets

INJECTORS, METHODS, AND SYSTEMS FOR DUAL FUEL COMBUSTION

This application is a U.S. National Stage Application of International Application No. PCT/US2022/051922 filed Dec. 6, 2022, which was published in English on May 25, 2023, as International Publication No. WO 2023/091802 A2.

TECHNICAL FIELDS

This invention is related to a fuel injector and a fuel injection system, fuel injection methods, and combustions methods using the same, applicable for a spark-ignition engine or a compression-ignition engine, or for combustion devices such as furnaces or turbines in general.

BACKGROUND OF THE INVENTION

The needs for emission reductions of carbon dioxide worldwide are requiring significant reductions of fossil fuel consumptions. However, renewable energies such as solar energy and wind energy are intermittent, low-cost energy storages and power conversions are necessary. Renewable fuels running on internal combustion engines and turbines provide a viable way for carbon emission reductions while facilitating energy storages and power conversions.

To accommodate the intermittent nature of renewable energies and infrastructure limitations for renewable fuel supplies, it is desirable to have a fuel injector which can directly inject two types of fuels on-demand for conventional and renewable fuels, differentiated by at least one parameter of injection pressure, molecular structure, and thermodynamics phases. Further, it is desirable to inject two types of fuels at different spray angles tailored for different injection timings at different engine load and speed conditions.

However, even though many inventions have been disclosed for dual fuel injectors and injectors with variable orifices, issues related to manufacture complexity, durability and fuel leaking have prevented many inventions from being mass production viable. These issues are especially true for common rail injectors with compact nozzles, where arrangement of complex fuel passages becomes a challenging task. These issues are especially true for gas fuel injections. Furthermore, few of previous disclosed arts can offer the injection capability of selectively and collectively direct inject different fuels without interfering with each other between the operations of injecting different fuels. Previous arts demand significant control complexity, especially for synchronizing the dual needle operations normally used for dual fuel injections.

Further, injection for gas and liquid fuels bring special issues for deliberately sizing orifice areas due to the density difference of liquid and gas, as well as sealing, lubricating and cooling gas needle valves. Conventional designs for direct injection gas needle valves bring significant issues for reliability and durability.

SUMMARY OF THE INVENTION

It is our goals of this invention to address key issues facing gas and liquid direct injections, such as gas sealing, needle valve cooling, reliability and durability, on-demand dual fuel injections and mixing. More specifically, this invention offers co-axial needle valve designs which can operate both selectively and collectively to give the freedom to inject either fuel of two supplied fuels, or a combination of two supplied fuels, on demand based on engine operation conditions to optimize combustion. Liquid fuels are used for actuating, sealing and cooling of gas injection valves. This work can be considered as an extension of our previous work disclosed in PCT/US20/62960.

A fuel injector for adaptive dual fuel injections has means to directly inject two types of fuels, which can be gas and liquid, or liquid and liquid, independently and collaboratively through a single nozzle. A fuel injection method and system, along with a combustion method using the same, are also disclosed. The disclosed injectors, methods, and systems are applicable to conventional gas and liquid fuels, such as diesel, gasoline, natural gas, propane, as well as renewable liquid and gas fuels in general, including e-fuels, such as biodiesel, methanol, ethanol, hydrogen, biomethane, etc. A novel combustion method is also disclosed to mitigate or eliminate the gas fuel fugitiveness of hydrogen and natural gas, etc., to reduce emissions and mitigate safety issues.

BRIEF DESCRIPTION OF THE DRAWINGS

FIG. 12*a*, I—liquid ON, II—gas OFF.

FIG. 12*b*, I—liquid ON, II—gas ON.

FIG. 12*c*, I—liquid OFF, II—gas ON.

FIG. 13*a*, I—liquid A ON, II—liquid B OFF.

FIG. 13*b*, I—liquid A ON, II—liquid B ON.

FIG. 13*c*, I—liquid A OFF, II—liquid B ON.

FIG. 14 gas—liquid injection strategies, partial gas is injected through intake ports (I) for medium to heavy engine loads. Partial gas is directly injected into combustion chamber (II).

Figure 3:
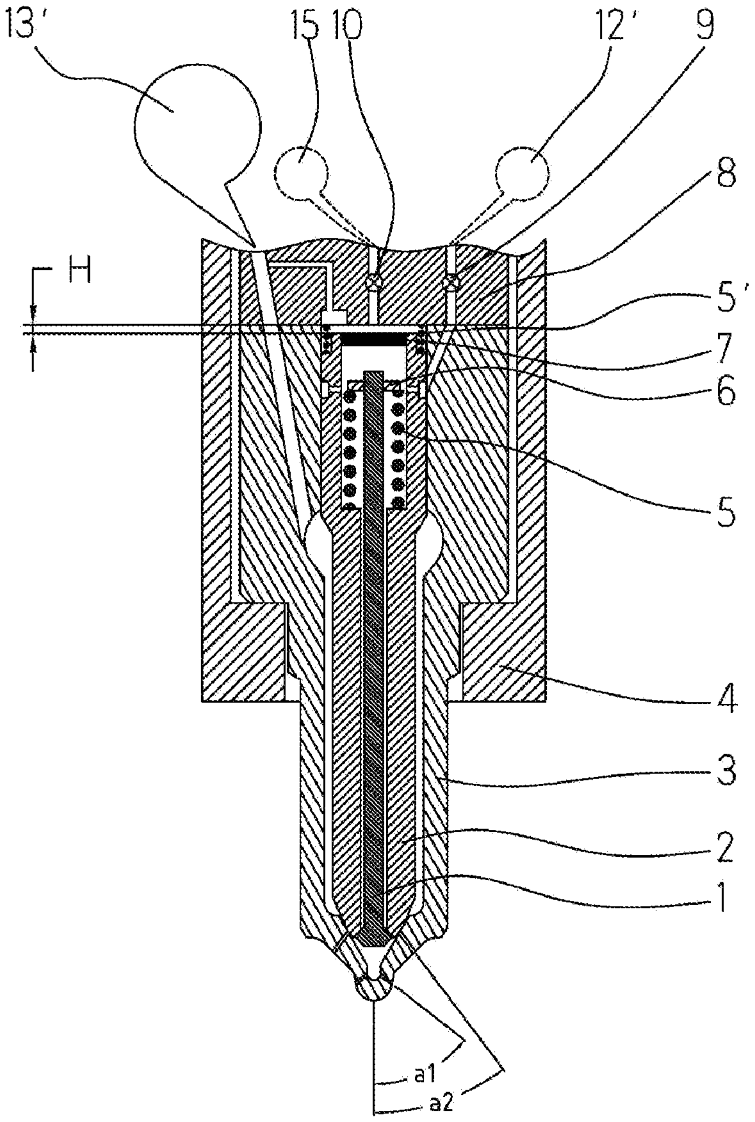
FIG. 3 is another fragmentary sectional view of a second exemplary embodiment of an injector of the invention with only key components marked; the embodiment is intended for liquid fuel as major fuel, gas fuel as minor fuel, gas fuel is injected through small needle valve (1).
Figure 4:
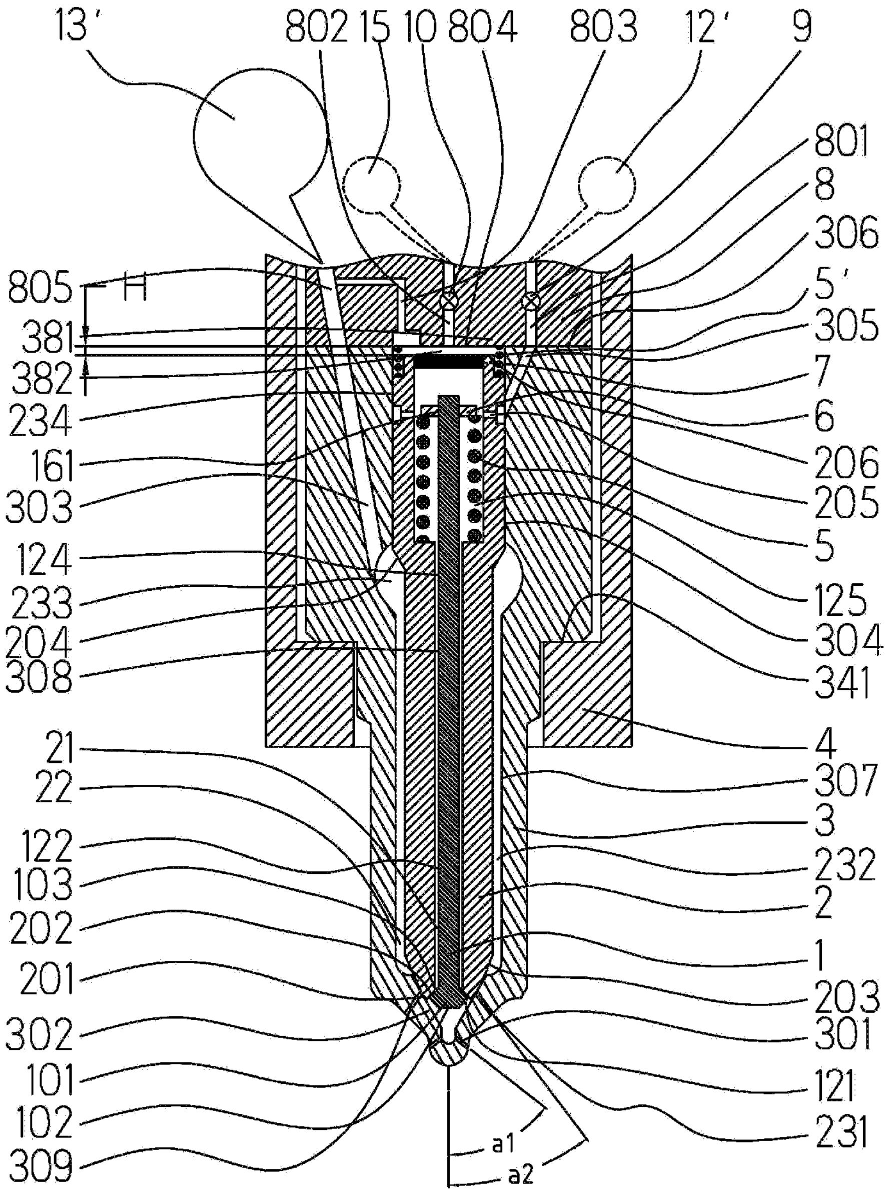
FIG. 4 is the same as FIG. 3, except with detailed notations for key components, key fuel passages, key surfaces, and key pressure control chambers marked.
Figure 5:
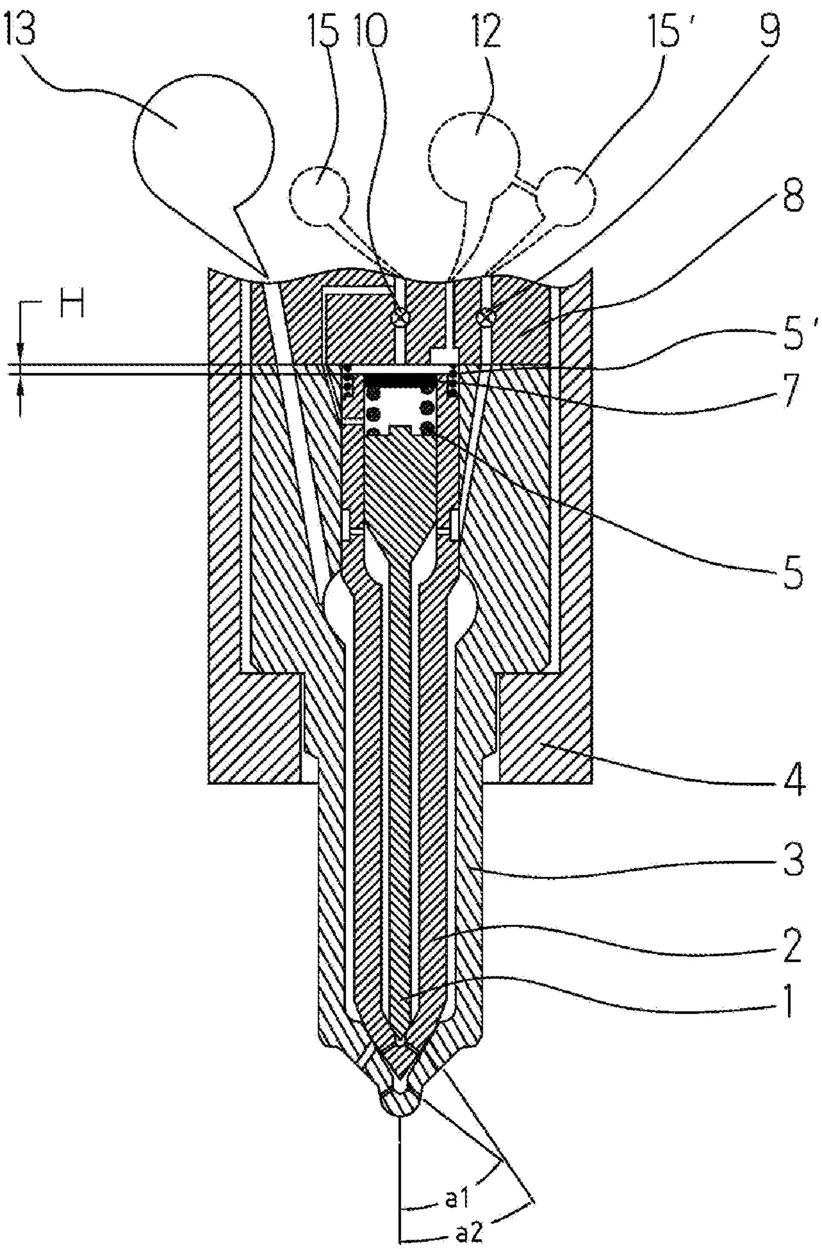
FIG. 5 is another fragmentary sectional view of a exemplary embodiment of an injector of the invention with only key components marked; gas fuel is major fuel.
Figure 6:
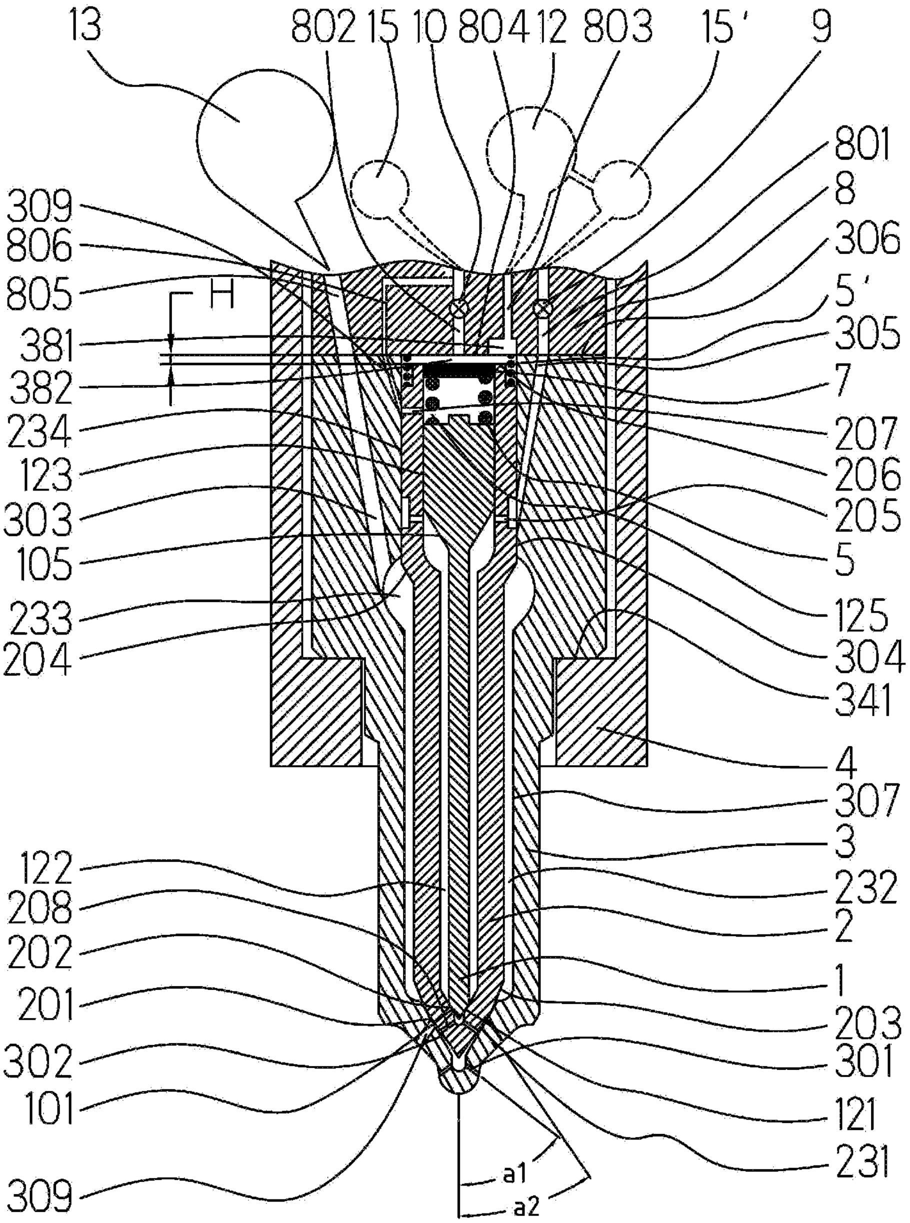
FIG. 6 is the same as FIG. 5 except with detailed notations for key components, key fuel passages, key surfaces, and key pressure control chambers marked.
Figure 7:
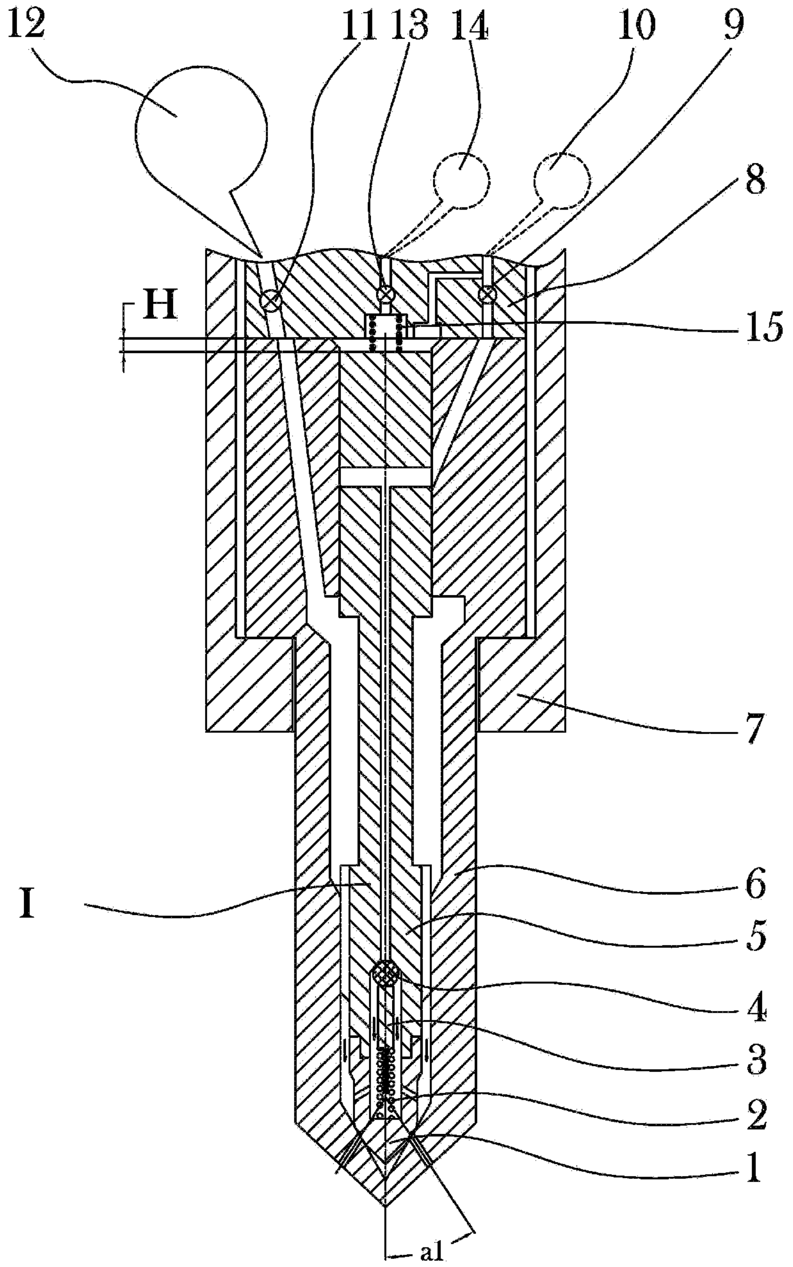
FIG. 7 is a fragmentary sectional view of another exemplary embodiment of an injector of the invention with only key components marked; gas fuel is major fuel.

Except specifically specified, in all the FIGS. 1~4:

In FIG. 1~4: 1—inner outward opening needle valve; 101—inner needle valve head, 121—inner fuel injection outlets formed by lifting needle valve 1, 102—head surface of 1, 103—seal surface of inner needle valve, 104—needle guide for 1, 122—fuel passage, 124—sliding surface, 125—pressure control chamber, 161—tightly fitted surface between 1 and 6, In FIG. 5~6: 1—inner inward opening needle valve; 101—inner needle valve, 121—the sealing surface formed by pressing needle 1 into seating position on needle valve 2, 121' (not shown)—seal surface of inner needle valve, 125—pressure or venting chamber;

- 2—outer inward opening needle valve; 201—sealing surface of 2, 202—sealing surface on 2 for needle valve 1, 203—needle guide of 2 (not shown), 204—thrusting surface of 2, 205—fuel inlet for pressure chamber, 206—top surface of 2, 207—fuel venting outlet, 208—inner fuel injection outlets, 231—contact sealing surface between needle 2 and nozzle body 3 when needle valve 2 is at seating position, 231'—fuel passage under needle seat of 2 when it is lifted, 232—fuel passage, 233—pressure chamber, 234—sectional sliding matched surface between 2 and 3, 122—fuel passage, 123—sectional sliding matched surface between 1 and 2;
- 3—nozzle body; 301—fuel injection outlets; 302—inner conical surface on nozzle body; 303—high pressure fuel passage leading fuel to pressure chamber 233, 304—sliding surface, 305—fuel passage leading fuel from fuel reservoir 15' to pressure control chamber 125, 306—nozzle large end, 307—inner bore of 3, 308—fuel channel, 381, 382—pressure chambers;
- 4—injector body cap; 341—contact surface between 3 and 4;
- 5, 5'—spring which urges needle valves 1 and 2 into seating positions;
- 6—clip ring to hold needle valve 1;
- 7—tight seal cap for pressure control chamber for needle valve 2;
- 8—valve block which holds valves and fuel passages, 801—fuel passage to valve 9, 802—pressure passage to venting valve 10, 803—high pressure passage; 804—bottom of valve block 8, 805, 806—fuel passages;
- 9—flow control valve;
- 10—venting control valve, which can be a single valve or a control valve having a throttling valve below it connecting to 802;
- 12—high pressure fuel reservoir, liquid or gas;
- 13—high pressure fuel reservoir, gas or liquid;
- 13'—high pressure fuel reservoir, liquid;
- 12 and 13 can be one such as common rail holding one type of fuel, or two common rails for different fuels or for one fuel with different pressure levels;
- 15—low pressure fuel sink; 15'—high pressure fuel reservoir;
- a1—half multiple jet spray angle for fuel injection outlets 301;
- a2—half multiple jet spray angle for fuel injection outlets 309;

FIG. 7 is a fragmentary sectional view of anotherexemplary embodiment of an injector of the invention with only key components marked; gas fuel is major fuel.

Figure 8:
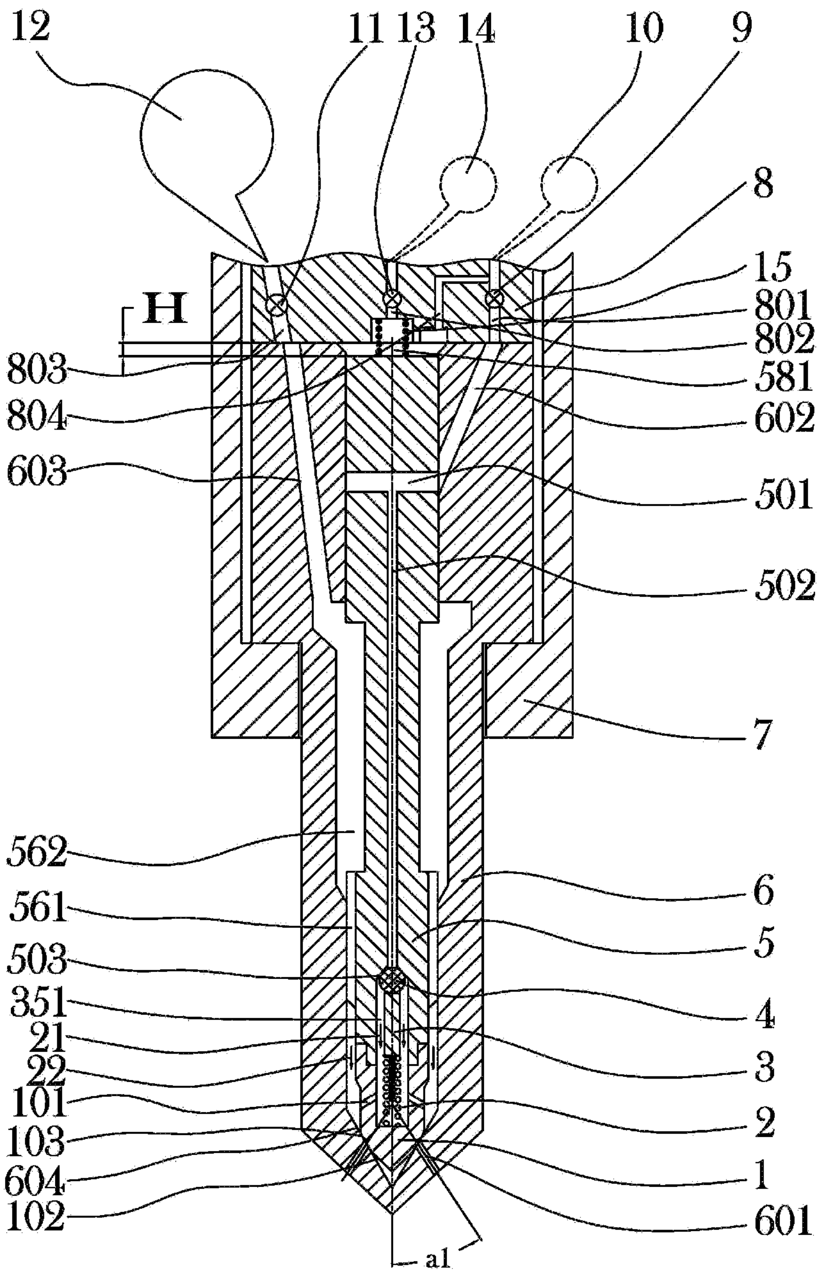
FIG. 8 is the same as FIG. 7 except with detailed notations for key components, key fuel passages, key surfaces, and key pressure control chambers marked.

FIG. 8 is the same as FIG. 7 except with detailed notations for key components, key fuel passages, key surfaces, and key pressure control chambers marked.

Figure 9:
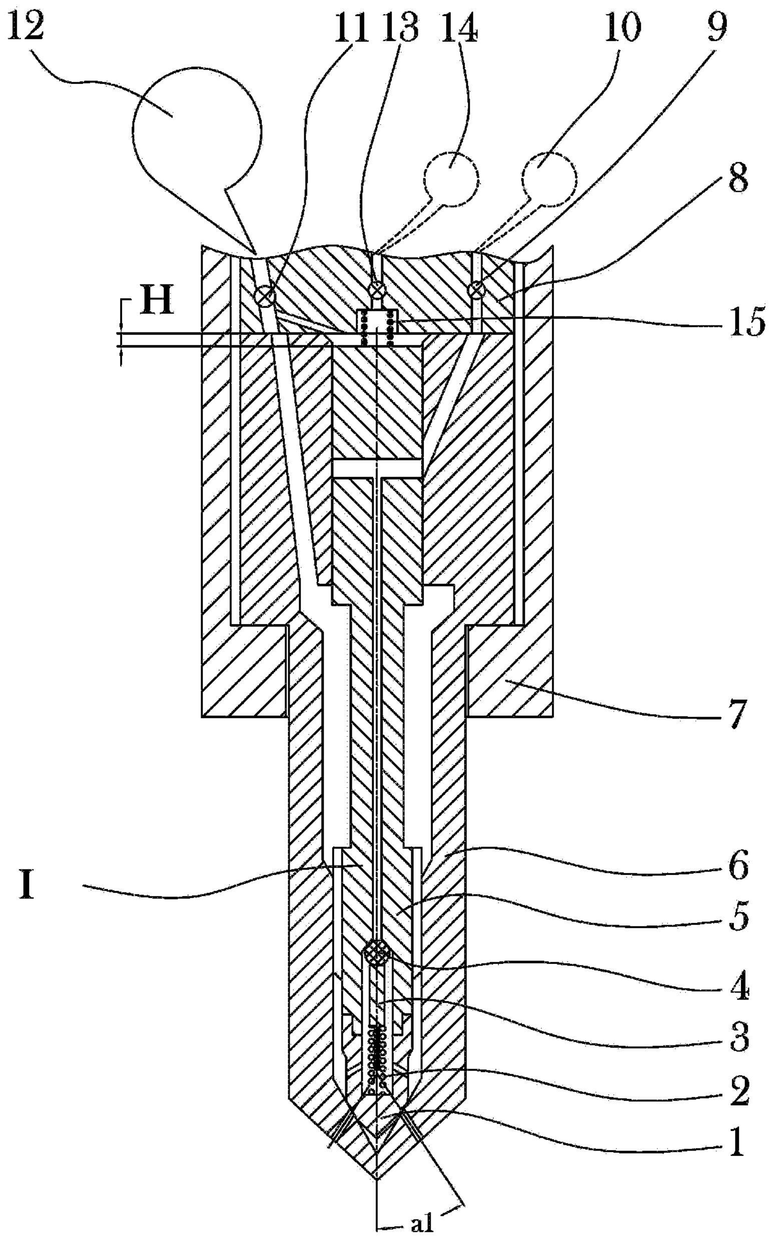
FIG. 9 is a fragmentary sectional view of another exemplary embodiment of an injector of the invention with only key components marked; liquid fuel is major fuel.

FIG. 9 is a fragmentary sectional view of anotherexemplary embodiment of an injector of the invention with only key components marked; liquid fuel is major fuel.

Figure 10:
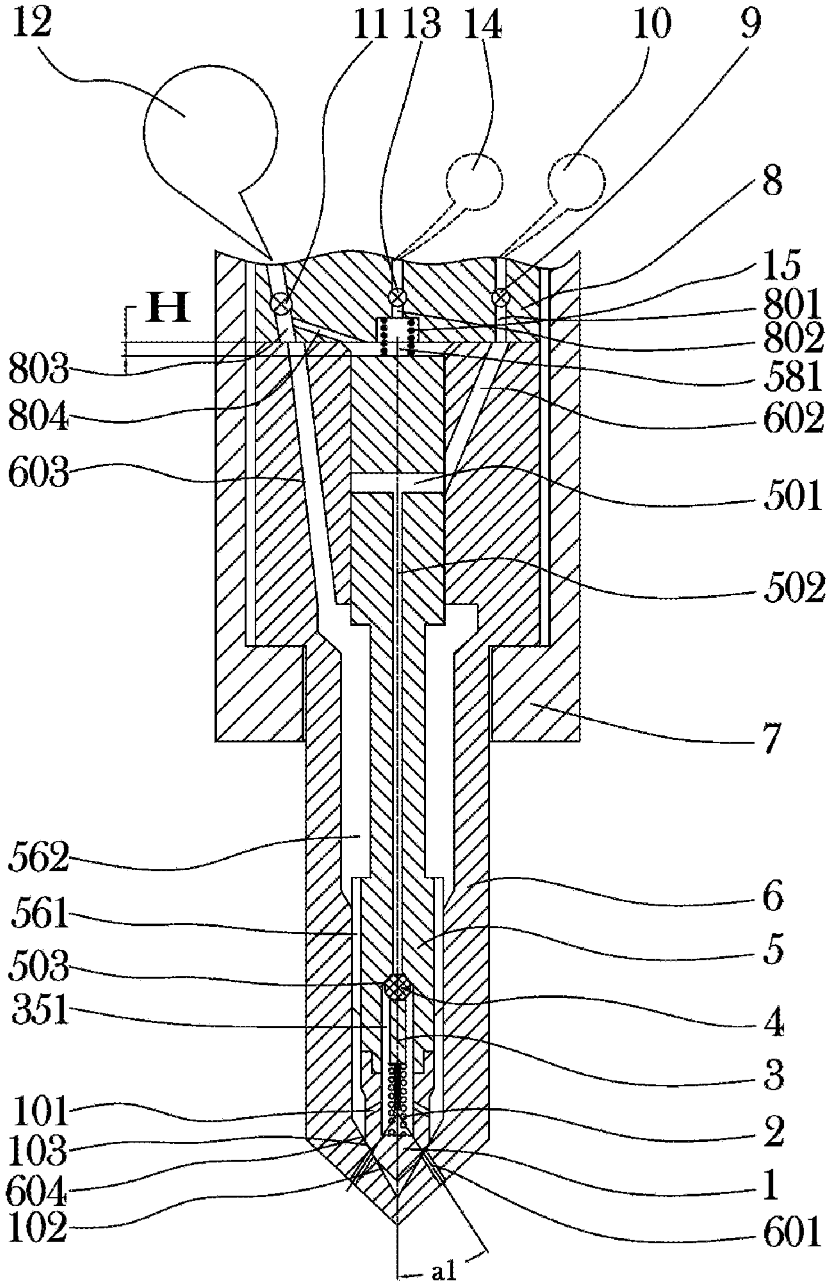
FIG. 10 is the same as FIG. 9 except with detailed notations for key components, key fuel passages, key surfaces, and key pressure control chambers marked.

FIG. 10 is the same as FIG. 9 except with detailed notations for key components, key fuel passages, key surfaces, and key pressure control chambers marked.

Figure 11A:
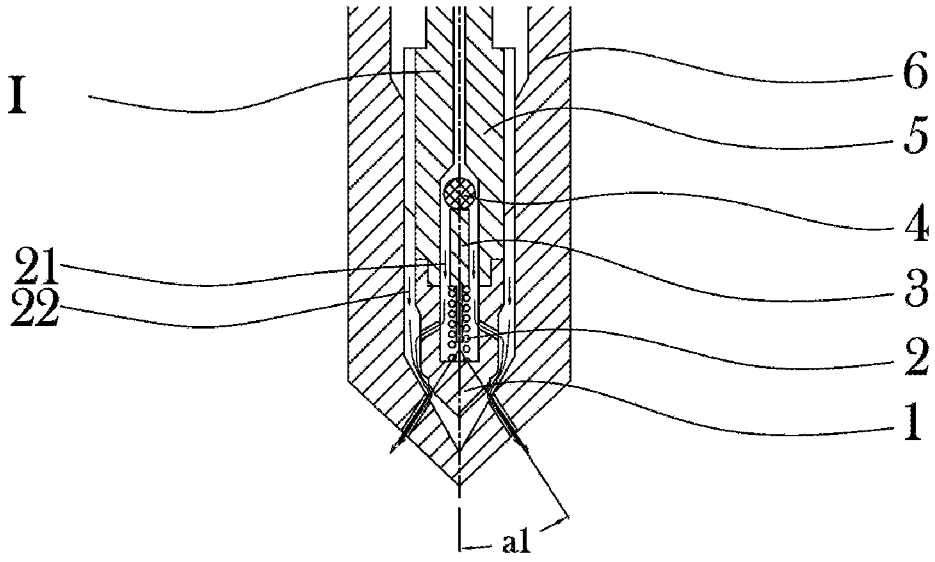
FIG. 11*a*, 11*b*, illustrates the nozzle tip structure and opening states.
Figure 11B:
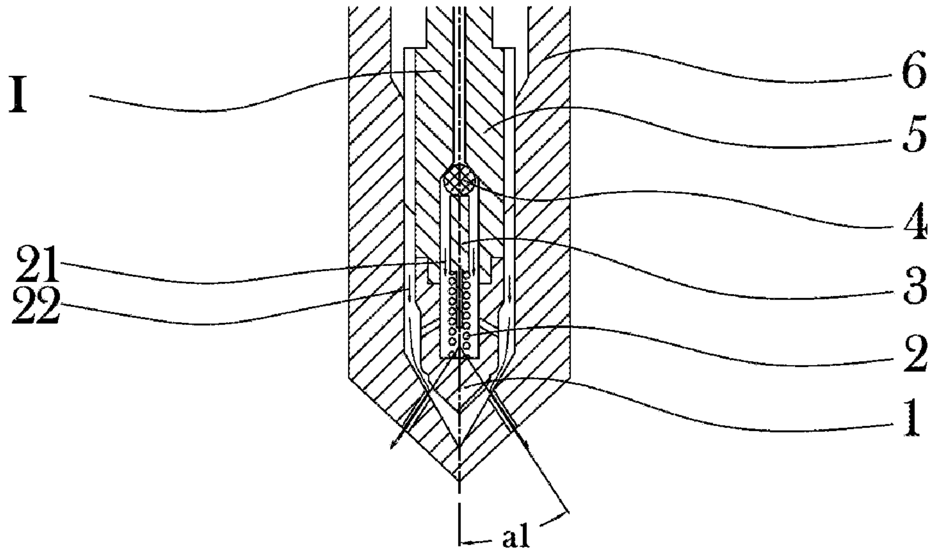

FIG. 11*a*, 11*b*, illustrate the nozzle tip structure and opening states Except specifically specified, in all the FIGS. 7~11:

- I—composite needle valve;
- 1—tip of the composite needle valve I; 101—outlets of I, 102, 103—tip surface sections of I;
- 2—spring within I;
- 3—T component;
- 4—one way check valve;
- 5—top section of needle valve I; 501, 502, 351—fuel passages within needle valve; 503—valve seat for one way check valve;
- 6—nozzle body; 601—fuel outlets; 602, 603, 562—fuel passages; 604—inner nozzle surface close to nozzle tip;
- 7—tighten nut;
- 8—valve block which holds valves and fuel passages, 801—high pressure fuel passage to control valve 9, 802—fuel passage to venting valve 13, 803—high pressure passage to control valve 11; 804—high pressure fuel passage to pressure control chamber 581;
- 9—flow control valve;
- 10—high pressure fuel reservoir, liquid or gas;
- 11—one way check valve, to block fuel from flowing into 12 from within nozzle;
- 12—high pressure fuel reservoir, liquid or gas;
- 13—pressure release control valve;
- 10 and 12 can be one such as common rail holding one type of fuel, or two common rails for different fuels or for one fuel with different pressure levels;
- 14—low pressure fuel reservoir or fuel sink;
- a1—half multiple jet spray angle for fuel injection outlets 601;

DETAILED DESCRIPTION OF THE PREFERRED EMBODIMENTS

Figure 1:
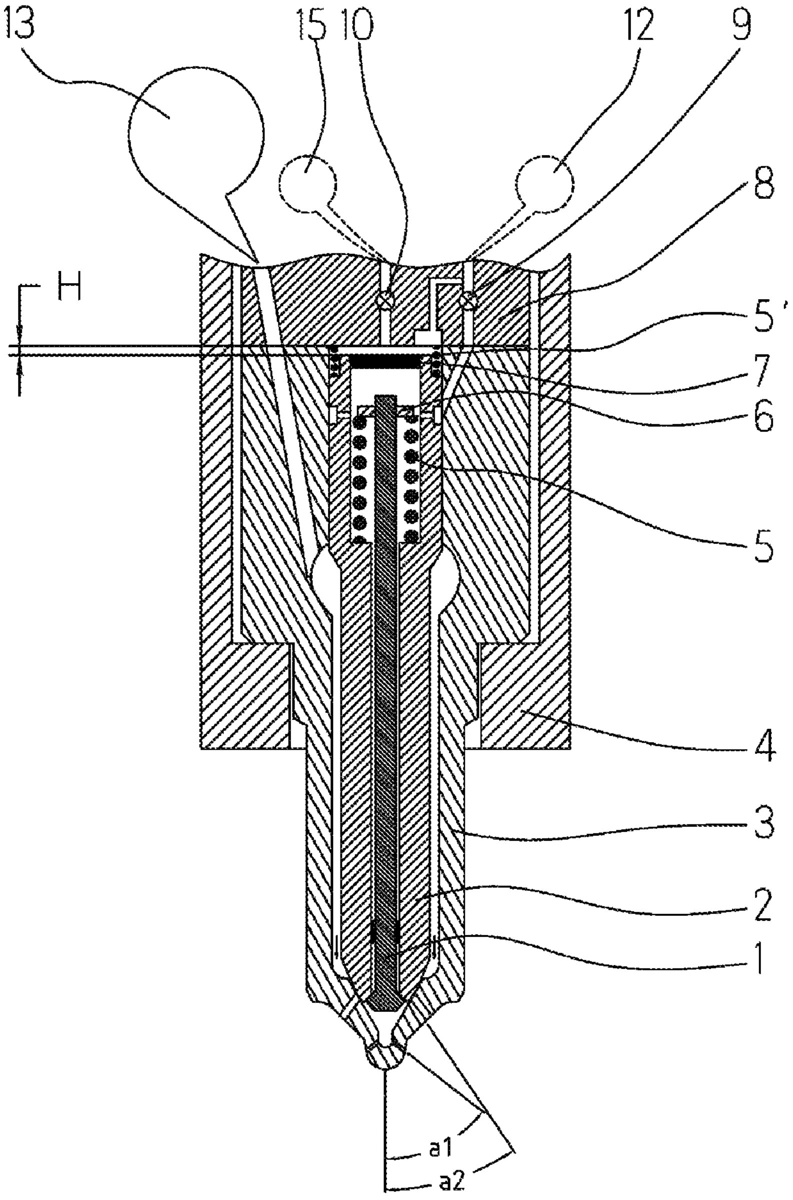
FIG. 1 is a fragmentary sectional view of a first exemplary embodiment of an injector of the invention with only key components marked, the embodiment is intended for gas fuel as major fuel, liquid fuel as minor fuel, gas fuel is injected through large needle valve (2).
Figure 2:
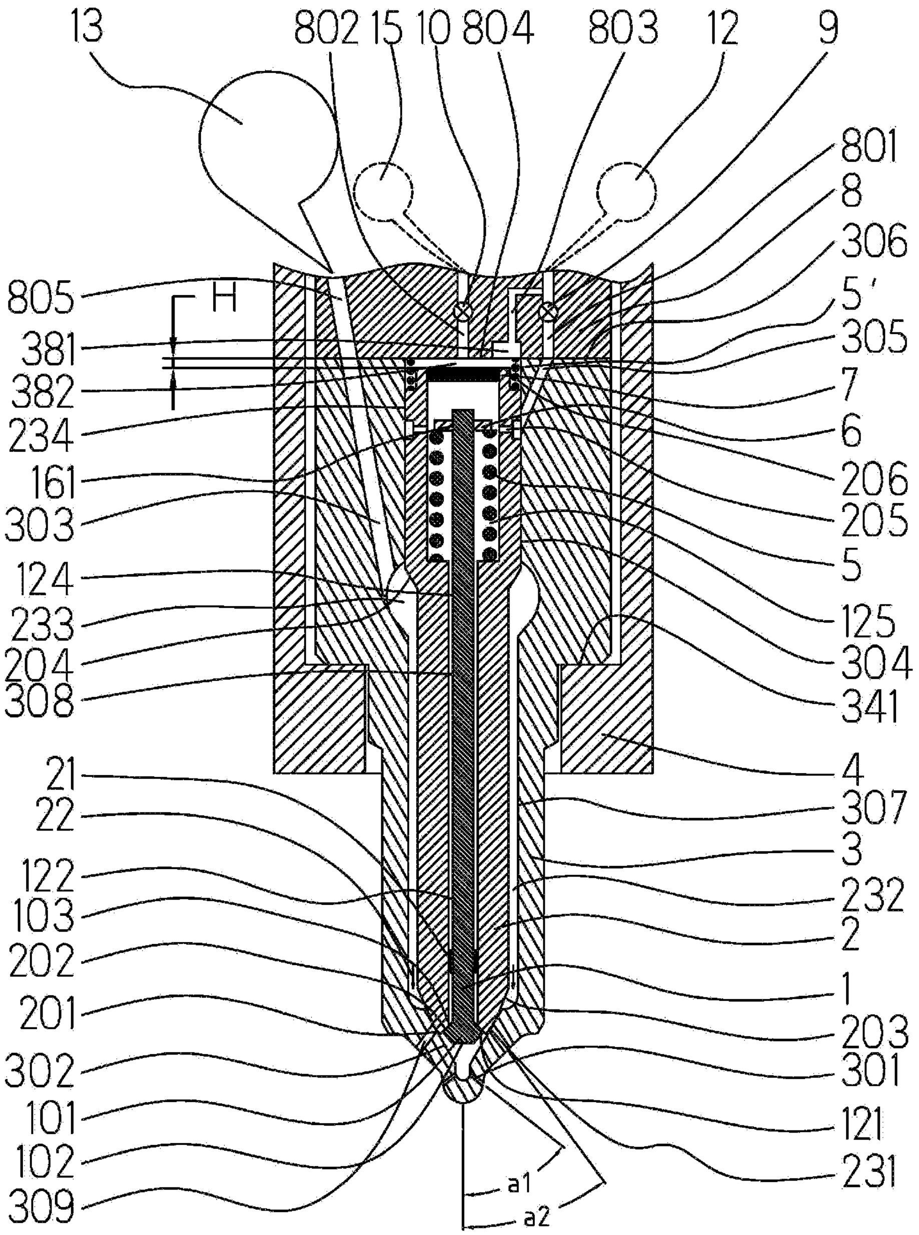
FIG. 2 is same as FIG. 1, except with detailed notations for key components, key fuel passages, key surfaces, and key pressure control chambers marked.

A first embodiment was shown in FIG. 1 to FIG. 2. FIG. 1~2 show the State I when both the outward opening valve

1 and inward opening valve 2 is at seating position, no fuel is injected. While at State I, valve 10 is closed, valve 9 is closed.

A second embodiment was shown in FIG. 3 to FIG. 4. FIG. 3~4 show the State I when both the inner inward opening valve 1 and outer inward opening valve 2 is at seating position, no fuel is injected. While at State I, valve 10 is closed, valve 9 is closed.

Other embodiments are shown in FIG. 5 to FIG. 10. FIG. 5, 6 are the same except detailed numberings in FIG. 6. FIG. 5&6, 7&8 are for gas fuel as major fuel. FIG. 9&10 are the same except detailed numberings in FIG. 10. FIG. 9&10 are for liquid fuel as major fuels.

FIG. 11*a*, 11*b* show the states of the needle valves at different opening positions.

Figure 12A:
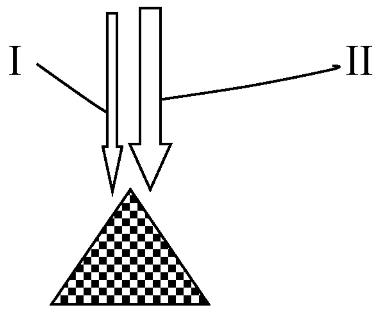
FIG. 12*a*, 12*b*, 12*c*, 13*a*, 13*b*, 13*c*, illustrates gas and liquid fuel direct injection strategies.
Figure 12B:
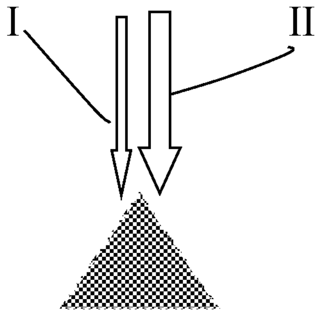
Figure 12C:
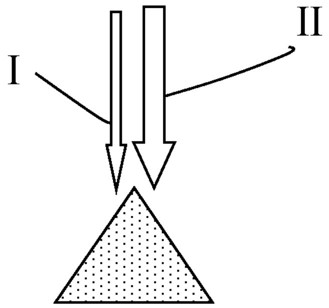

FIG. 12 illustrates the states of fuel injections by individually and simultaneously activating liquid and gas valves, for gas-liquid dual fuel injections.

Figure 13A:
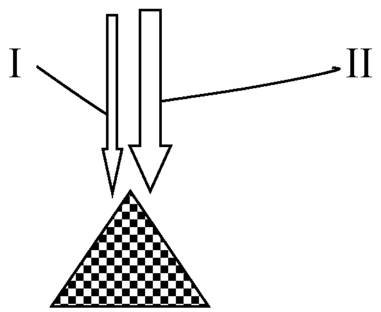
Figure 13B:
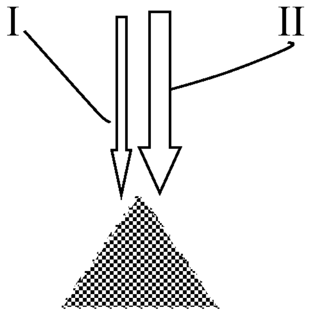
Figure 13C:
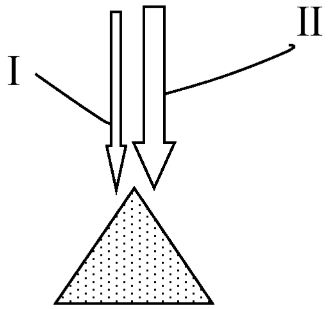

FIG. 13 illustrates the states of fuel injections by individually and simultaneously activating liquid and liquid valves, for liquid-liquid dual fuel injections.

Figure 14:
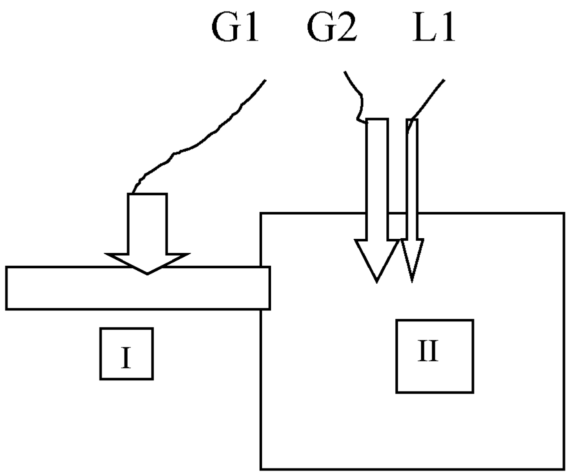
FIG. 14, 15 illustrates gas and liquid fuel hybrid injection strategies.

FIG. 14 illustrates gas and liquid fuel injection strategies, wherein gas fuels can be selectively injected from either or both intake ports and direct injections into combustion chambers, according to the engine loads. For light engine loads, gas fuels are directly injected into combustion chamber to reduce emissions and gas fuel fugitivity. For medium to heavy loads, gas fuels are injected through both intake ports and direct injection injectors to accommodate the needs for sufficient gas fuel flow rates.

Figure 15:
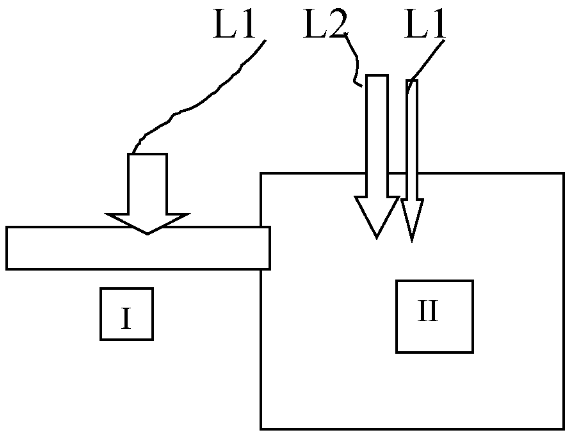
FIG. 15 liquid—liquid injection strategies, partial liquid is injected through intake ports (I) for medium to heavy engine loads. Partial liquid is directly injected into combustion chamber (II).
Figure 16A:
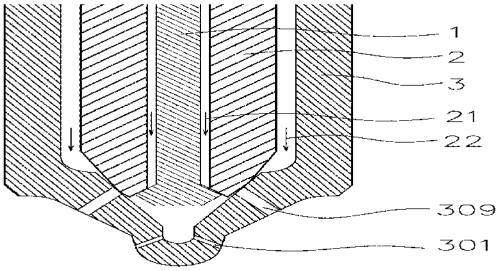
FIG. 16*a*, 16*b*, 16*c*, 16*d* and FIG. 17*a*, 17*b*, 17*c*, 17*d* illustrates the nozzle tip structures and fuel injection states of the fuel injectors. illustrates the states of fuel injections by individually and simultaneously activating liquid and gas valves.
Figure 16B:
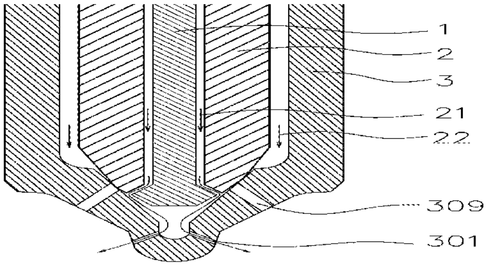
Figure 16C:
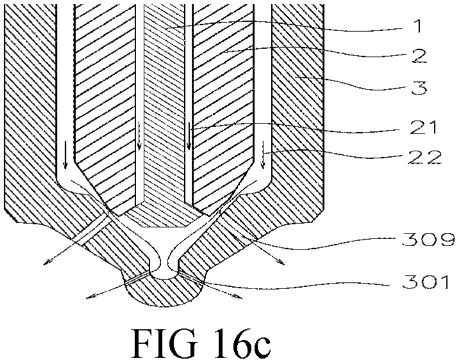
Figure 16D:
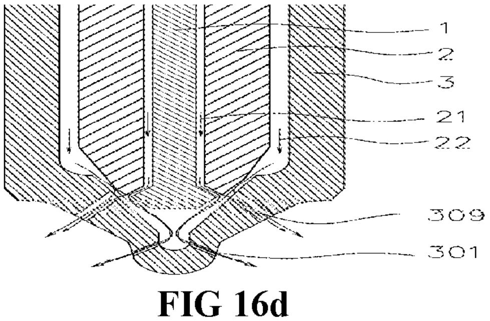
Figure 17A:
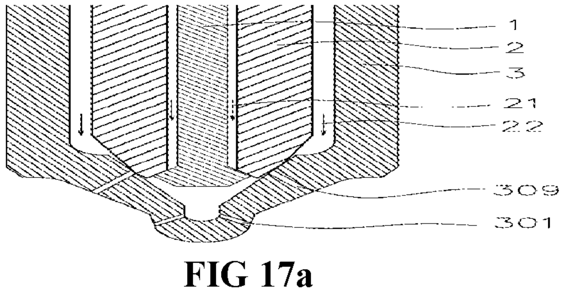
Figure 17B:
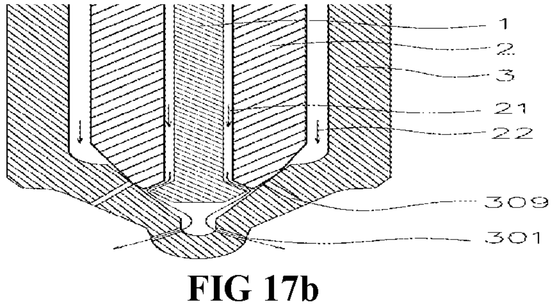
Figure 17C:
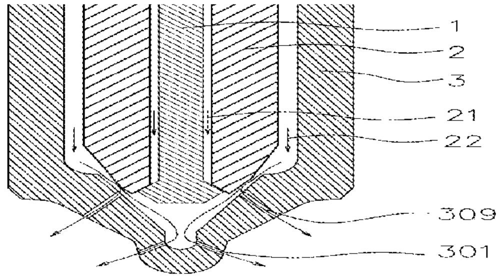
Figure 17D:
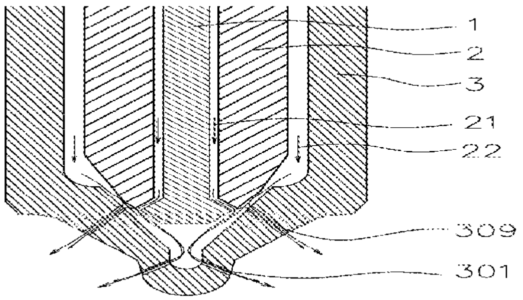

FIG. 15 illustrates liquid and liquid fuel injection strategies, wherein one liquid fuel, which has lower reactivity, can be selectively injected with intake port injections and direct injections into combustion chambers, according to the engine loads. For light engine loads, all liquid fuels are directly injected into combustion chamber to reduce emissions and improve efficiency. For medium to heavy loads, one liquid fuel with lower reactivity is injected through both intake port injectors and direct injection injectors, while one liquid fuel with higher reactivity is directly injected into combustion chamber at chosen timings, all direct injection fuels are injected through a single dual fuel injector for every combustion chamber.

FIG. 16*a*, 16*b*, 16*c*, 16*d* illustrates the tip structure and injection opening states of injection valves of the fuel injectors, for gas-liquid injections. FIG. 16*a*, 16*b*, 16*c*, 16*d* have two rows of holes with different spray angles and different flow areas. Note that in FIG. 16*a*, 16*b*, 16*c*, 16*d*, when the larger needle is at seating position, the upper row of larger holes are substantially covered.

FIG. 17*a*, 17*b*, 17*c*, 17*d* illustrates the tip structure and injection opening states of injection valves of the fuel injectors, for liquid-liquid injections. FIG. 17*a*, 17*b*, 17*c*, 17*d* have two rows of holes with different spray angles and but similar flow areas. Note that in FIG. 17*a*, 17*b*, 17*c*, 17*d*, when the larger needle is at seating position, the upper row of injection holes are substantially covered.

Figure 18:
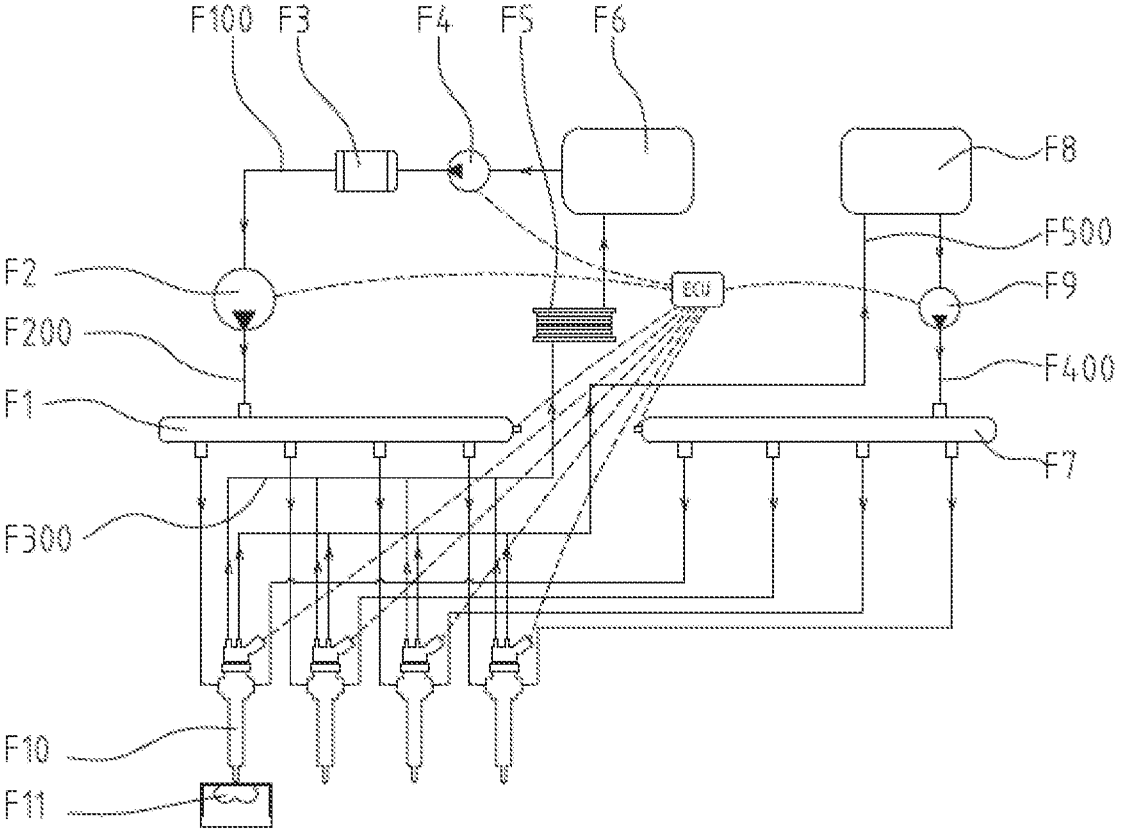
FIG. 18 illustrates the dual fuel injection systems.

FIG. 18 illustrates the dual fuel injection systems. For fuels in both loops, it can be either liquid or gas fuels.

Figure 19:
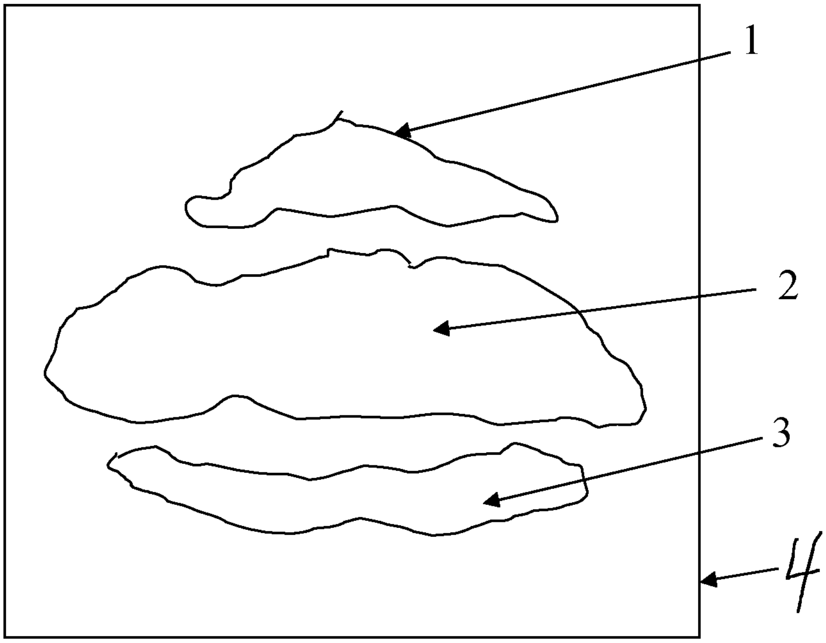
FIG. 19 illustrates a new combustion method. 1—liquid fuel with high reactivity; 2—gas fuel with low reactivity; 3—liquid fuel with high reactivity; gas fuel mixture is sandwiched with liquid fuel mixtures; 4—combustion chamber.

F1—high pressure common rail for high lubricity fuel; F2—high pressure fuel pump; F3—filter; F4—low pressure fuel pump for high lubricity fuel; F5—fuel cooler; F6—fuel tank for high lubricity fuel; F7—common rail for low lubricity fuel; F8—fuel tank for low lubricity fuel; F9—fuel pump for low lubricity fuel;

F10—fuel injector; F11—combustion chamber; F100—low pressure delivery loop section for high lubricity fuel; F200—high pressure delivery loop section for high lubricity fuel; F300—low pressure delivery loop section for spent return high lubricity fuel; F400—pressure delivery loop section for low lubricity fuel; F500—low pressure delivery loop section for spent return low lubricity fuel;

FIG. 19 illustrates a new combustion method, in which gas fuel mixtures are sandwiched between neighboring liquid fuel mixtures.

Figure 20:
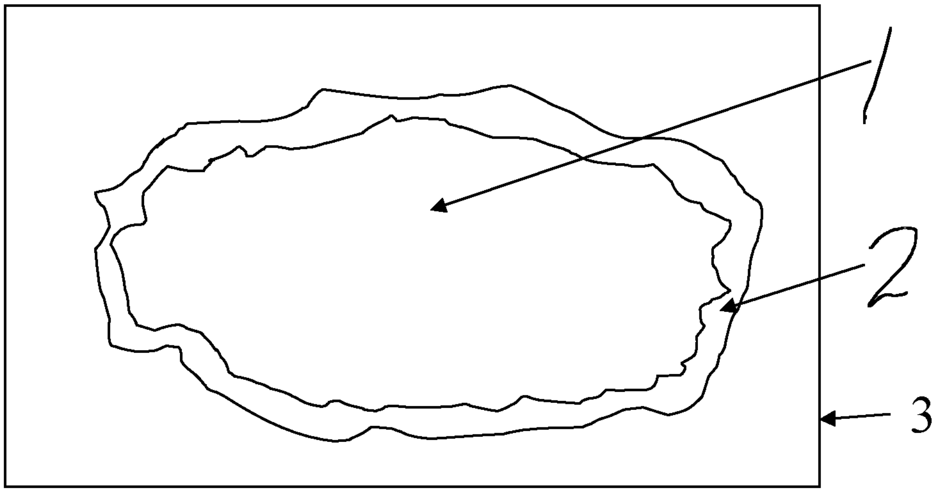
FIG. 20 illustrates a new combustion method. 1—liquid fuel with high reactivity; 2—gas fuel with low reactivity; gas fuel mixture is wrapped with liquid radicals. 3—combustion chamber.

FIG. 20 illustrates a new combustion method, in which gas fuel mixtures are wrapped with liquid fuel mixtures.

The combustion methods in FIG. 19, 20 are intended to use more reactive liquid fuel radicals to eliminate fugitive diffusions of gas fuels.

We have illustrated a number of embodiments here. For those skilled in the art, it is easy to give alternatives based on the same operation mechanism. The embodiments illustrated here should be considered as examples without limiting the scope of the invention. Other embodiments with the same key characteristics are considered under the scope of this invention. For example, the first fuel and second fuel are the same fuel, thus the injector becomes a single fuel injector. For another example, one fuel stream could be replaced by fluids such as water or carbon dioxide to enhance combustion process. Following features are considered as the key characteristics of the invention.

1. STATEMENT A: Referring to FIG. 2, A fuel injector for dual fuel injections, comprising:

(i) a nozzle body (3) comprising passages for fuels, an inner cylindrical bore (307) for receiving two longitudinally displaceable coaxial needle valves (1, 2), at least one group of fuel injection outlets (301, 309) in said nozzle body, at least one spring (5, 5') which urges said needle valves (1, 2) into biased seating positions to block fuels, and a valve block (8) to hold control valves and having fuel inlets which can be connected to two pressured fuel reservoirs (12, 13), pressure control chambers (382, 125) which can press and release needle valves through connecting to pressurized and depressurized fuels, and the two pressure control chambers (382, 125) for the two needle valves (1, 2) are connected to the same fuel reservoir which contains fuel with higher lubricity among the pressured fuel reservoirs (12, 13), wherein liquid fuel with higher lubricity is used for controlling actuations and lubricating the needle valve for low lubricity fuel.

2. A fuel injector of STATEMENT A, refer to FIG. 1, 2, comprising:

(i) the outward opening needle valve (1), has an opening position which is moving away relative to a nozzle body large end (306) to inject fuel from at least one pressurized fuel reservoir through an annular fuel outlet (121) and fuel injection outlets (301), and a seating position to block fuel flow, and (ii) the inward opening needle valve (2), which is fully contained in the said nozzle body (3), has an opening position by moving toward said nozzle body large end (306) to connects at least one pressurized fuel reservoir (13) and fuel injection outlets (309, 301) to inject fuel, wherein the lifting of the inward opening needle valve (2) is independent of the position of the outward opening needle valve (1), and, has a seating position being in contact with a sealing surface of nozzle body to block fuel flow from fuel inlets to fuel injection outlets (309), a sealing surface (201) at seating position is up stream of injection outlets (309), and (iii) characterized in that the said outward opening needle valve (1) is partially contained in said inward opening needle valve (2) and has a biased siting position on said inward opening needle valve (2), wherein the lifting of outward opening needle valve (1) is independent of the position of said inward opening needle valve (2), wherein it is comprising at least two control valves (9, 10) to block or connect at least one type of fuel from high pressure fuel reservoirs (13, 12) to low pressure fuel sink (15) to produce the lifting and closing forces on said inward opening and outward opening needle valves (1, 2) through generating pressure differences in pressure control chambers (382, 125).

(iv) different fuel channel sizes being chosen to surround the outward opening needle valve (1) and inward opening needle valve (2), such that it meets the needs of delivering desired fuel mass for different fuel densities at liquid or gas state.

Wherein, said fuel injector has means to inject different fuels at different thermal physical states independently and collectively.

3. A fuel injector of STATEMENT A, refer to FIG. 1, 2, which is used for gas-liquid dual fuel injections and gas is a major fuel, wherein the control chamber (382) for large needle valve (2), which is for blocking gas flow, is connected to pressured liquid fuel reservoir (12), wherein the liquid fuel presses down the gas needle valve (2) while lubricating the gas needle valve (2) along matched sliding surface (234) between the needle valve (2) and nozzle body (3).

A fuel injector of STATEMENT A, refer to FIG. 5&6, comprising of, (i) a nozzle body (3) comprising passages for fuels, an inner cylindrical bore (307) for receiving two longitudinally displaceable coaxial inward opening needle valves (1, 2) with an inner inward opening needle valve being hold within an outer outward opening needle valve, at least one group of fuel injection outlets (208, 309) in the nozzle body, at least one spring (5, 5') which urges the needle valves (1, 2) into biased seating positions to block fuels, and a valve block (8) to hold control valves and having fuel inlets which can be connected to two pressured fuel reservoirs (13, 15'), pressure control chambers (382, 125) which can press and release needle valves through applying pressurized and de-pressurized fuels, and (ii) the inner inward opening needle valve (1), which has an opening position by moving toward nozzle body large end (306) to inject fuel from at least one pressurized reservoir (15') through one inner fuel injection outlets (208) and another group of outer fuel injection outlets (301), and a biased seating position to block fuel flow, and (iii) the outer inward opening needle valve (2), which is fully contained in the nozzle body (3), has an opening position by moving toward nozzle body large end to connect at least one pressurized fuel reservoir (13) and fuel injection outlets (309, 301) to inject fuel, has a biased seating position with its sealing surface (201) being in contact with the sealing surface of nozzle body to block fuel flow, the sealing surface (201) at seating position is up stream of injection outlets (309), wherein the lifting of outer opening needle valve (2) is independent of the position of the inner inward opening needle valve (1);

(iv) the outer inward opening needle valve (2) has an inner seat (202) for the inner inward opening needle valve (1), the inner needle valve (1) is fully contained in the outer needle valve (2), wherein the lifting of inner inward opening needle valve (1) is independent of the position of the outer inward opening needle valve (2);

(v) different channel sizes being chosen to surround the outward opening needle valve (1) and inward opening needle valve (2), such that it meets the needs of delivering desired fuel mass for different fuel densities at liquid or gas status.

4. A fuel injector of STATEMENT A, refer to FIG. 1, 2, 16*a*, 16*b*, which is used for gas-liquid dual fuel injections and gas is a major fuel, wherein the control chamber (382) for large needle valve (2), which is for blocking gas flow, is connected to pressured liquid fuel source (12), and the nozzle has two rows of orifice with one row of orifice (309) is substantially larger than another lower row of orifices (301) next to nozzle tip, wherein when the large needle (2) is seated, the said larger orifices (309) are substantially covered by said large needle valve (2)

5. A fuel injector of STATEMENT A, refer to FIG. 3, 4, which is used for gas-liquid dual fuel injections and gas is a minor fuel, wherein the control chamber (382) for large needle valve (2), which is for blocking liquid, is connected to pressured liquid fuel reservoir (13').

6. STATEMENT B: Refer to FIG. 7, A fuel injector for dual fuel injection, comprising: a nozzle body (6) comprising passages (603, 562, 602) for fuels, an inner cylindrical bore for receiving a composite needle valve (I) which can move up and down in axial direction, at least one group of fuel injection outlets (601) in said nozzle body, at least one spring (15) which urges said composite needle valve (I) into a biased seating position to block fuels, and a valve block (8) holding control valves (9, 13) and having fuel inlets connected to at least one of pressured fuel reservoirs (10, 12), a pressure control chamber (581), which is connected to the same pressured fuel reservoir which contains higher lubricity fuel among the pressured fuel reservoirs (10, 12), the said control chamber (581) can be used to press and release the said composite needle valve (I), wherein said composite needle valve contains a one way check valve (4).

7. A fuel injector of STATEMENT B, refer to FIG. 7, 8, which is used for gas-liquid dual fuel injections and gas is a major fuel, wherein the control chamber (581) for large needle valve (5), which is used for blocking gas flow, is always connected to pressured liquid fuel source (10), wherein the liquid fuel in the control chamber (581) presses down gas needle valve while lubricating said gas needle valve (5).

8. A fuel injector of STATEMENT B, refer to FIG. 9, 10, which is used for gas-liquid dual fuel injections and gas is a minor fuel, wherein the control chamber (581) for liquid blocking large needle valve (5) is always connected to a pressured liquid fuel reservoir, which is (12) for FIG. 9, 10.

9. A fuel injector of STATEMENT B, refer to FIG. 7, 9, comprising:

a composite needle valve is composing of inner fuel channels (501, 502, 351) connected to independently controlled fuel reservoir (10), a one way check valve (4) supported by a T shape component (3) and a spring (2) which urges the said check valve (4) against its seat (503), capped by a needle tip (1) which has fuel outlets (101), has an opening position which is moving up toward nozzle large end to inject fuel from at least one pressurized fuel reservoir through fuel injection outlets (101, 601), and a seating position to block fuel flow.

10. A fuel injector according to STATEMENT A, or STATEMENT B, refer to FIG. 17*a*, 17*b*, 17*c*, 17*d*, wherein it has means to inject one type of liquid fuel through fuel injection outlets (301) by lifting said outward opening needle valve (1) and inject another type of liquid fuel through multiple jet fuel outlets (309) and (301) by lifting said inward opening needle valve (2) independently, wherein the injections of two types of fuels can be independently or simultaneously.

11. A fuel injector according to any statements of paragraphs 1-5, Refer to FIG. 16*a*, 16*b*, 16*c*, 16*d*, wherein it has means to inject one type of liquid fuel mainly through fuel injection outlets (301) by lifting said outward opening needle valve (1) and inject another type of gas fuel through multiple jet fuel outlets (309) and (301) by lifting said inward opening needle valve (2) independently, wherein the major fuel outlets for gas fuel (309) are substantially larger than fuel outlets for liquid fuels (301), wherein the injections of two types of fuels can be independently or simultaneously.

12. STATEMENT C: Referring to FIG. 12*a*, 12*b*, 12*c*, 13*a*, 13*b*, 13*c*, 16*a*, 16*b*, 16*c*, 16*d*, A fuel injection method, which directly injects both liquid and gas fuel on-demand, wherein it has means to directly inject one type of liquid fuel, wherein the injections of two types of fuels can be independently or simultaneously through the same nozzle tip, and liquid fuel is used for controlling gas fuel injection actuations, enhancing cooling and sealing, and lubricating gas injection needle valves. The cooling is provided through liquid fuel channels inside and above gas needle valves, the enhanced sealing and lubricating effects are provided by thin liquid films filled between sliding or matched surfaces.

13. A fuel injection method of STATEMENT C, where the liquid fuel is gasoline, the gas fuel is natural gas.

14. A fuel injection method of STATEMENT C, where the liquid fuel is diesel, the gas fuel is natural gas.

15. A fuel injection method of STATEMENT C, where one type of fuel is diesel, another type of fuel is hydrogen.

16. A fuel injection method of STATEMENT C, where one type of fuel is dimethyl ether, another type of fuel is natural gas.

17. fuel injection method of STATEMENT C, where one type of fuel is dimethyl ether, another type of fuel is hydrogen.

18. A fuel injection method of STATEMENT C, refer to FIG. 14, for internal combustion engines applications, partial gas fuel is injected through engine ports (I) during high loads and medium loads, gas fuel is only directly injected into combustion chamber (II) during light loads.

19. STATEMENT D: Referring to FIG. 19, 20, A combustion method, wherein one fuel stream is of diesel like liquid fuel with higher chemical reactivity, one stream is gas fuel with lower chemical reactivity such as natural gas, hydrogen, ammonia vapor, wherein it has means to optimize combustion under different operating conditions, through blending the two streams on-demand outside nozzle and inside combustion chamber, wherein the injections of two types of fuels are sequential and sandwiched to mitigate fugitive diffusions of gas fuels, wherein the more reactive mixtures of liquid fuels prevent the escaping of gas fuel mixtures to ensure complete gas fuel combustion.

20. A combustion method of STATEMENT D, wherein partial fuels of fuel streams with lower reactivity are purposely poured into burned zones, so that partial fuels with low reactivity are reformed inside the combustion chambers to promote its combustion process.

21. A combustion method of STATEMENT D, wherein the injections of two types of fuels are co-injected and mixed to form radical wrapped mixture clouds to mitigate fugitive diffusion of gas fuels to ensure complete combustion of gas fuel.

22. A combustion method of STATEMENT D, wherein the liquid fuel is diesel or biodiesel, the gas fuel is hydrogen, wherein the injection quantity of diesel is less than 3% of total injected fuel according to energy ratios.

STATEMENT E: Refer to FIG. 18, 14, 15, 16*a*, 16*b*, 16*c*, 16*d*, 17*a*, 17*b*, 17*c*, 17*d*, A fuel injection system for dual fuel injections, which can be used as retrofit kits for retrofitting existing engines or new engines, wherein a secondary fuel system delivers pulsed pressurized fuel to the fuel injectors of first injection system, wherein the first fuel system has fuel injectors bearing needle valves containing passive actuated inner injection valves to introduce secondary fuel on-demand for coupled dual fuel injections.

The invention claimed is:

1. A fuel injector, comprising:

a nozzle body comprising passages for fuels, an inner cylindrical bore for receiving two longitudinally displaceable coaxial needle valves, at least one group of fuel injection outlets in said nozzle body, at least one spring which urges the needle valves into biased seating positions to block fuels, and a valve block to hold control valves and having fuel inlets which can be connected to two pressured fuel reservoirs, pressure control chambers which can press and release needle valves through connecting to pressurized and depressurized fuels, and the two pressure control chambers for the two needle valves are connected to the same fuel reservoir which contains fuel with higher lubricity among the pressured fuel reservoirs, wherein liquid fuel with higher lubricity is used for controlling actuations and lubricating the needle valve for low lubricity fuel, wherein the fuel injector is used for gas-liquid dual fuel injections and gas is a major fuel, wherein the control chamber for large needle valve, which is for blocking gas flow, is connected to pressured liquid fuel reservoir, wherein the liquid fuel presses down the gas needle valve while lubricating the gas needle valve along matched sliding surface between the needle valve and nozzle body.

2. A fuel injector of claim 1, comprising:

the outward opening needle valve, has an opening position which is moving away relative to a nozzle body large end to inject fuel from at least one pressurized fuel reservoir through an annular fuel outlet and fuel injection outlets, and a seating position to block fuel flow, and the inward opening needle valve, which is fully contained in the said nozzle body, has an opening position by moving toward said nozzle body large end to connect at least one pressurized fuel reservoir and fuel injection outlets to inject fuel, wherein the lifting of the inward opening needle valve is independent of the position of the outward opening needle valve, and, has a seating position being in contact with a sealing surface of nozzle body to block fuel flow from fuel inlets to fuel injection outlets, a sealing surface at seating position is up stream of injection outlets, and characterized in that the said outward opening needle valve is partially contained in said inward opening needle valve and has a biased siting position on said inward opening needle valve, wherein the lifting of outward opening needle valve is independent of the position of said inward opening needle valve, wherein it is comprising at least two control valves to block or connect at least one type of fuel from high pressure fuel reservoirs to low pressure fuel sink to produce the lifting and closing forces on said inward opening and outward opening needle valves through generating pressure differences in pressure control chambers, different fuel channel sizes being chosen to surround the outward opening needle valve and inward opening needle valve, such that it meets the needs of delivering desired fuel mass for different fuel densities at liquid or gas state, wherein, said fuel injector has fuel injector outlets to inject different fuels at different thermal physical states independently and collectively.

3. A fuel injector of claim 1, which is used for gas-liquid dual fuel injections and gas is a major fuel, wherein the control chamber for large needle valve, which is for blocking gas flow, is connected to pressured liquid fuel source, and the nozzle has two rows of orifice with one row of orifice is substantially larger than another lower row of orifices next to nozzle tip, wherein when the large needle is seated, the said larger orifices are substantially covered by said large needle valve.

4. A fuel injector of claim 1, which is used for gas-liquid dual fuel injections and gas is a minor fuel, wherein the control chamber for large needle valve, which is for blocking liquid, is connected to pressured liquid fuel reservoir.

5. A fuel injector according to claim 1, wherein it has means to inject one type of liquid fuel through fuel injection outlets by lifting said outward opening needle valve and inject another type of liquid fuel through multiple jet fuel outlets and by lifting said inward opening needle valve independently, wherein the injections of two types of fuels can be independently or simultaneously.

6. A fuel injector according to claim 1, wherein it has means to inject one type of liquid fuel mainly through fuel injection outlets by lifting said outward opening needle valve and inject another type of gas fuel through multiple jet fuel outlets and by lifting said inward opening needle valve independently, wherein the major fuel outlets for gas fuel are substantially larger than fuel outlets for liquid fuels, wherein the injections of two types of fuels can be independently or simultaneously.

7. A fuel injector of claim 1, comprising, a nozzle body comprising passages for fuels, an inner cylindrical bore for receiving two longitudinally displaceable coaxial inward opening needle valves with an inner inward opening needle valve being hold within an outer inward opening needle valve, at least one group of fuel injection outlets in the nozzle body, at least one spring which urges the needle valves into biased seating positions to block fuels, and a valve block to hold control valves and having fuel inlets which can be connected to two pressured fuel reservoirs, pressure control chambers which can press and release needle valves through applying pressurized and de-pressurized fuels, and the inner inward opening needle valve, which has an opening position by moving toward nozzle body large end to inject fuel from at least one pressurized reservoir through one inner fuel injection outlets and another group of outer fuel injection outlets, and a biased seating position to block fuel flow, and the outer inward opening needle valve, which is fully contained in the nozzle body, has an opening position by moving toward nozzle body large end to connect at least one pressurized fuel reservoir and fuel injection outlets to inject fuel, has a biased seating position with its sealing surface being in contact with the sealing surface of nozzle body to block fuel flow, the sealing surface at seating position is up stream of injection outlets, wherein the lifting of outer opening needle valve is independent of the position of the inner inward opening needle valve;

the outer inward opening needle valve has an inner seat for the inner inward opening needle valve, the inner needle valve is fully contained in the outer needle valve, wherein the lifting of inner inward opening needle valve is independent of the position of the outer inward opening needle valve.

8. A fuel injector, comprising:

a nozzle body comprising passages for fuels, an inner cylindrical bore for receiving a composite needle valve which can move up and down in axial direction, at least one group of fuel injection outlets in said nozzle body, at least one spring which urges said composite needle valve into a biased seating position to block fuels, and a valve block holding control valves and having fuel inlets connected to at least one of pressured fuel reservoirs, a pressure control chamber, which is connected to the same pressured fuel reservoir which contains higher lubricity fuel among the pressured fuel reservoirs, the said control chamber can be used to press and release the said composite needle valve, wherein said composite needle valve contains a one way check valve.

9. A fuel injector of claim 8, which is used for gas-liquid dual fuel injections and gas is a major fuel, wherein the control chamber for large needle valve, which is used for blocking gas flow, is always connected to pressured liquid fuel source, wherein the liquid fuel in the control chamber presses down gas needle valve while lubricating said gas needle valve.

10. A fuel injector of claim 8, which is used for gas-liquid dual fuel injections and gas is a minor fuel, wherein the control chamber for liquid blocking large needle valve is always connected to a pressured liquid fuel reservoir.

11. A fuel injector of claim 8, comprising:

a composite needle valve is composing of inner fuel channels connected to independently controlled fuel reservoir, a one way check valve supported by a T shape component and a spring which urges the said check valve against its seat, capped by a needle tip which has fuel outlets, has an opening position which is moving up toward nozzle large end to inject fuel from at least one pressurized fuel reservoir through fuel injection outlets, and a seating position to block fuel flow.

12. A fuel injector according to claim 8, wherein it has means to inject one type of liquid fuel through fuel injection outlets by lifting said outward opening needle valve and inject another type of liquid fuel through multiple jet fuel outlets and by lifting said inward opening needle valve independently, wherein the injections of two types of fuels can be independently or simultaneously.

13. A fuel injection method, which directly injects both liquid and gas fuel on-demand, wherein the injections of two types of fuels can be independently or simultaneously through the same nozzle tip, and liquid fuel is used for controlling gas fuel injection actuations, enhancing cooling and sealing, and lubricating gas injection needle valves, wherein the fuel injection method is for internal combustion engines applications, partial gas fuel is injected through engine ports during high loads and medium loads, all gas fuel is directly injected into combustion chamber during light loads.

14. A fuel injection method of claim 13, where the liquid fuel is diesel, the gas fuel is natural gas.

15. A fuel injection method of claim 13, where one type of fuel is diesel, another type of fuel is hydrogen.

16. Fuel injection method of claim 13, where one type of fuel is dimethyl ether, another type of fuel is hydrogen.

* * * * *